United States Patent [19]

Mitchell

[11] Patent Number: 4,487,295
[45] Date of Patent: Dec. 11, 1984

[54] DISC BRAKE CALIPER WITH INTEGRAL PARKING BRAKE

[75] Inventor: Clarence I. Mitchell, Xenia, Ohio

[73] Assignee: General Motors Corporation, Detroit, Mich.

[21] Appl. No.: 498,900

[22] Filed: May 27, 1983

[51] Int. Cl.³ ............................................. F16D 55/224
[52] U.S. Cl. .................................. 188/72.6; 188/72.8; 188/106 F; 192/94
[58] Field of Search ................... 188/71.9, 71.8, 71.7, 188/71.1, 72.6, 72.1, 72.9, 106 F, 196 P, 72.7, 72.8, 196 F; 192/41 S, 41 A, 94

[56] References Cited

U.S. PATENT DOCUMENTS 3,378,109 4/1968 Bauman .......................... 188/71.9
3,550,732 12/1970 Beller ........................... 188/71.9 X
3,653,470 4/1972 Travis ............................ 188/71.9
3,991,859 11/1976 Coulter et al. ................. 188/106 F Primary Examiner—Bruce H. Stoner, Jr.
Assistant Examiner—Michael P. Gilday
Attorney, Agent, or Firm—D. D. McGraw

[57] ABSTRACT

A pressure actuated disc brake has a mechanical arrangement for actuating the disc brake for parking. It has a coil spring clutch mechanism, or a sprag clutch mechanism, acting on a sleeve nut, which is threaded on a piston shaft. A drive arrangement causes the clutch mechanism to grip the sleeve nut and rotate the nut to move the shaft and piston to mechanically actuate the brake.

5 Claims, 2 Drawing Figures

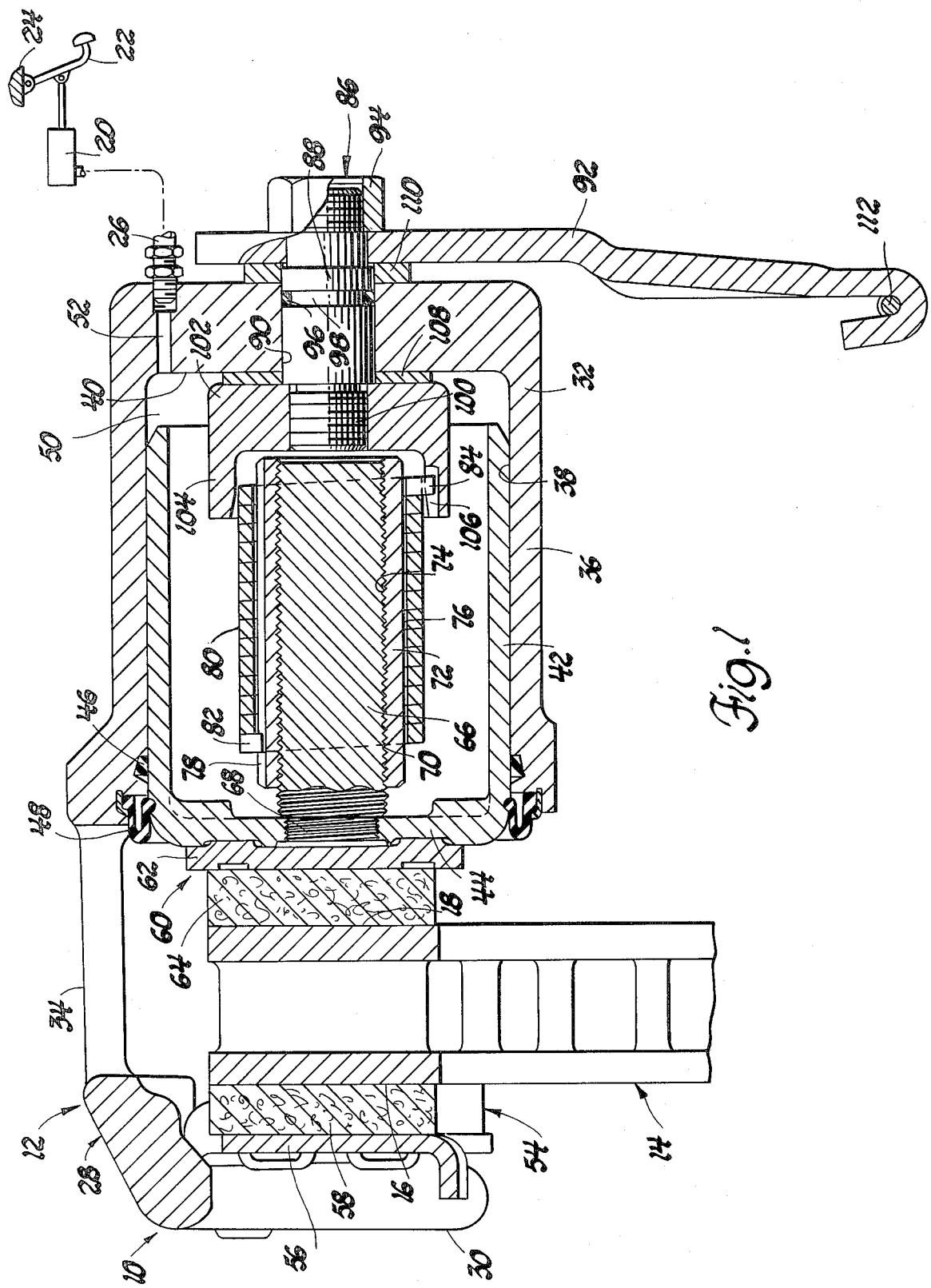

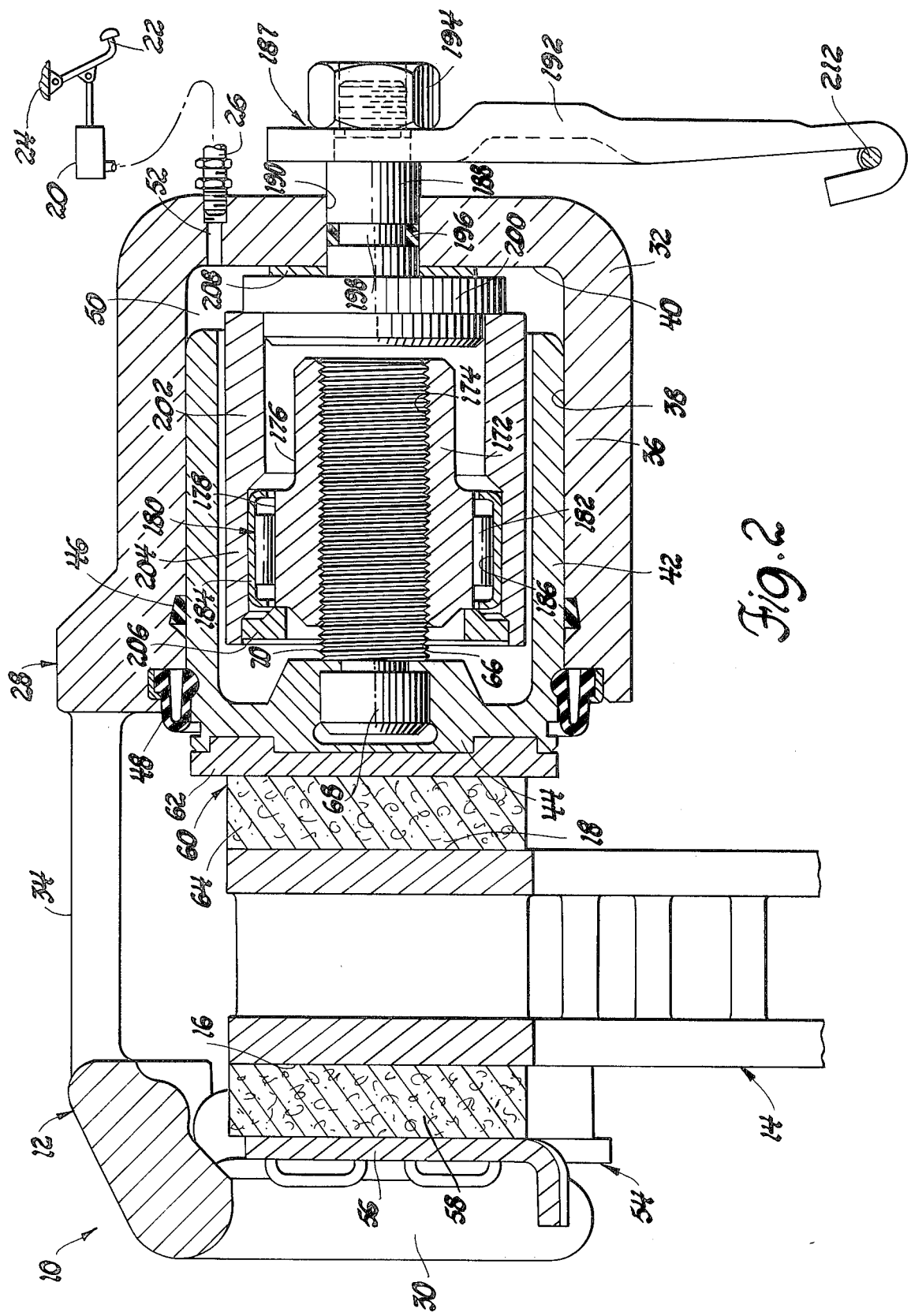

DISC BRAKE CALIPER WITH INTEGRAL PARKING BRAKE

The invention relates to a disc brake caliper assembly which provides hydraulic actuation for service braking and mechanical actuation for parking braking. It uses a clutch mechanism acting on a sleeve nut, which is threaded on a shaft secured to or forming a part of the actuating piston. A mechanically rotated shaft and drive member assembly is connected to actuate and deactuate the clutch to transmit the parking brake force through the clutch to the sleeve nut and cause the threaded shaft to move the piston in the brake engaging direction. Rotation of the shaft and drive member assembly in the other direction releases the clutch and permits retraction of the piston and threaded shaft.

IN THE DRAWINGS

FIG. 1 shows portions of a vehicle brake assembly with one embodiment of the invention and having parts broken away and in section.

FIG. 2 is similar to FIG. 1 and shows another embodiment of the invention.

The vehicle brake assembly 10 includes a caliper assembly 12 and a rotatable disc 14 operatively secured to a vehicle wheel (not shown). The disc 14 has opposed friction braking surfaces 16 and 18. The caliper assembly is mounted on a suitable mounting bracket (not shown) so that it is slidably movable during brake engagement and release. The vehicle brake system is schematically illustrated as also including a master cylinder 20 actuated by a brake pedal 22 pivotally mounted on a vehicle portion 24. The master cylinder is connected to the caliper assembly by a conduit 26.

Caliper assembly 12 includes a caliper body 28 formed to provide an outboard caliper leg 30, an inboard caliper leg 32 and a bridge section 34 joining the two caliper legs and extending over the outer periphery of disc 14. The inboard caliper leg 32 is formed to define a cylinder 36 having a cylinder side wall 38 and cylinder end wall 40. The open end of the cylinder opens towards the caliper outboard leg 30. A cup-shaped piston 42 is slidably mounted in cylinder 36 with the piston head 44 extending through the open end of the cylinder toward disc friction braking surface 18. A suitable seal 46 and a boot 48 are provided to seal the piston and cylinder and to prevent the entry of dust or other contaminants into the cylinder. The piston and the cylinder walls define a pressure chamber 50 to which conduit 26 is connected by pressure inlet 52. Thus, in the hydraulic brake system illustrated, hydraulic fluid under pressure from the master cylinder 20 is introduced into chamber 50 to actuate the brake. If the brake is an air actuated brake, an air pressure arrangement would be provided to introduce air into chamber 50 for that purpose.

An outboard brake shoe assembly 54, composed of a backing plate 56 and friction material formed to provide a friction pad 58, is suitably mounted on outboard caliper leg 30 so that the friction material may engage the disc friction braking surface 16 in friction braking relation when the brake is actuated. An inboard brake shoe assembly 60, composed of backing plate 62 and friction material forming a friction pad 64, is mounted to be engaged by piston head 44 for movement with the piston 42 so that the friction material 64 engages disc friction braking surface 18 when the brake is actuated and retracts with the piston when the brake is released. Shoe assembly 60 so engages piston head 44 as to prevent rotation of the piston in the cylinder 36, in a manner well known in the art. A threaded shaft 66 is suitably secured to piston head 44 at one shaft end 68 so that the shaft extends axially within the piston and is located in the portion of pressure chamber 50 contained within piston 42. Shaft 66 has suitable external threads 70 formed thereon. A sleeve nut 72 has a threaded inner surface 74 and is threaded onto shaft 66.

Referring more specifically to the embodiment shown in FIG. 1, the sleeve nut outer surface 76 has at least a portion which defines a clutch inner surface. Outer surface 76 has an axially extending groove 78 therein. A coil spring clutch 80 is received about the sleeve nut outer surface 76 so that in the normal relaxed condition of the clutch, the clutch does not grip outer surface 76 of the sleeve nut. The clutch 80 has one end 82 extending inwardly and received in slidable relation in sleeve nut groove 78. The other clutch end 84 extends outwardly.

A shaft and drive member assembly 86 includes a shaft 88 rotatably mounted in an axially extending opening 90 formed through cylinder end wall 40. The outer end of shaft 88 is configured to receive an arm 92 thereon retained by a suitable device such as retainer nut 94. Arm 92 is nonrotatably mounted on shaft 88. A seal 96 in a shaft groove 98 seals opening 90 against brake fluid leakage. The inner end 100 of shaft 88 extends into pressure chamber 50 and has a drive member 102 secured thereto. The drive member 102 is illustrated as being generally cup-shaped with a skirt section 104 extending over the spring clutch end 84. An internal groove 106 formed in skirt section 104 receives spring clutch end 84 therein in sliding relation. Rotation of the drive member 102 in either arcuate direction will move spring clutch end 84 with it. Suitable bearing elements such as washers 108 and 110 are mounted on shaft 88 to provide bearing surfaces for drive member 102 and arm 92.

During service braking actuation, the master cylinder 20 is actuated and brake fluid under pressure is delivered to chamber 50. It acts against the piston 42 to move piston and brake shoe assembly 60 toward disc 14 until the friction material 64 engages the disc friction braking surface 18. Pressurization in chamber 50 also causes the caliper housing 28 to move in the opposite direction to engage the friction material 58 of the outboard brake shoe assembly 54 with the other disc friction braking surface 16. Further pressurization generates braking action in a well known manner. Actuating movement of piston 42 carries threaded shaft 66 and sleeve nut 72 with the piston, the spring clutch end 82 permitting sliding movement of the sleeve nut 72 relative to the clutch. Upon brake release, the pressure in chamber 50 is released and the piston retracts, actuated by seal 46 in a well known manner. If the friction materials 58 and 64 have been sufficiently worn, the piston, as well as threaded shaft 66 and sleeve nut 72, will return to an adjusted position.

When it is desired to mechanically actuate the brake assembly, arm 92 is rotated by suitable means such as parking brake cable 112, rotating shaft 88 and drive member 102 in an arcuate direction. Drive member 102 carries spring clutch end 84 with it, exerting torsional stress on the spring clutch and tending to wind it up, causing it to decrease its inner diameter until the spring coils engage the sleeve nut outer surface 76 in gripping relation. Futher rotation of drive member 102 transmits brake actuating forces through the spring clutch to drive sleeve nut 72 arcuately. This causes threaded shaft 66 to be moved axially in sleeve nut 72 toward disc 14, thus driving piston 42 in the brake actuating direction. The brake shoe assemblies are forced into engagement with the disc 14 in the same manner as before, actuating the brake assembly.

When the parking brake is released, brake apply tension on cable 112 is released and arm 92 as well as assembly 86 returns arcuately to the released position. This causes spring clutch 80 to be released from sleeve nut 72 and permits retracting movement of piston 42 along with shaft 66 and nut 72 in the same manner as earlier described.

The embodiment shown in FIG. 2 uses a sprag or roller clutch instead of a coil spring clutch. In describing that embodiment, the same reference numerals are used as appropriate. A sleeve nut 172 has a threaded inner surface 174 and is threaded onto shaft 66. The sleeve nut outer surface 176 has a portion which defines a clutch inner race 178. A sprag clutch 180 is received about the clutch inner race 178 so that in the normal relaxed condition of the clutch, the clutch does not grip the sleeve nut. The clutch 180 has rollers or sprags 182 mounted in a cage 184 forming the clutch outer race 186. The sprags 182 are received in axially slidable relation on sleeve nut race 178.

A shaft and drive member assembly 187 includes a shaft 188 rotatably mounted in an axially extending opening 190 formed through cylinder end wall 40. The outer end of shaft 188 is configured to receive the arm 192 thereon retained by a suitable device such as retainer nut 194. Arm 192 is nonrotatably mounted on shaft 188. A seal 196 in a shaft groove 198 seals opening 190 against brake fluid leakage. The inner end 200 of shaft 188 extends into pressure chamber 50 and has a drive member 202 secured thereto. The drive member 202 is illustrated as being generally cylindrical with a section 204 having the clutch cage 184 securely fitted therein so as to be arcuately driven thereby. A retainer 206 is secured in the open end of section 204 and limits axial movements of the clutch 180 and sleeve nut 172 relative to drive member 202. Rotation of the drive member 202 in either arcuate direction will move clutch cage 184 with it. A suitable bearing element such as washer 208 is mounted on shaft 188 to provide a bearing surface for shaft end 200.

During service brake actuation, the master cylinder 20 is actuated and brake fluid under pressure is delivered to chamber 50. It acts against the piston 42 to move piston and brake shoe assembly 60 toward disc 14 until the friction material 64 engages the disc friction braking surface 18. Pressurization in chamber 50 also causes the caliper housing 28 to move in the opposite direction to engage the friction pad 58 of the outboard brake shoe assembly 54 with the other disc friction braking surface 16. Further pressurization generates braking action in a well known manner. Actuating movement of piston 42 carries threaded shaft 66 and sleeve nut 172 with the piston, the clutch sprags 182 permitting sliding movement of the sleeve nut 172 relative to the clutch. Upon brake release, the pressure in chamber 50 is released and the piston retracts, actuated by seal 46 in a well known manner. If the friction pads 58 and 64 have been sufficiently worn, the piston, as well as threaded shaft 66 and sleeve nut 172, will return to an adjusted position.

When it is desired to mechanically actuate the brake assembly, arm 192 is rotated by suitable means such as parking brake cable 212, rotating shaft 188 and drive member 202 in an arcuate direction. Drive member 202 carries clutch cage 184 with it, locking the sprags on the outer race 186 formed by cage 184 and on the inner race 178 of the sleeve nut 172. Futher rotation of drive member 202 transmits torsional brake actuating forces through the clutch 180 to drive sleeve nut 172 arcuately. This causes threaded shaft 66 to be moved axially in sleeve nut 172 toward disc 14, thus driving piston 42 in the brake actuating direction. The brake shoe assemblies are forced into engagement with the disc 14 in the same manner as before, actuating the brake assembly.

When the parking brake is released, brake apply tension on cable 212 is released and arm 192 as well as assembly 187 returns arcuately to the released position. This causes clutch 180 to be released from sleeve nut 172 and permits retracting movement of piston 42 along with shaft 66 and nut 172 in the same manner as earlier described.

The embodiments of the invention in which an exclusive property or privilege is claimed are defined as follows:

1. In a vehicle brake assembly of the type including a disc brake caliper positioned in relation to a brake disc whereby friction pads are applied to opposite sides of the brake disc when the brakes are applied, the improvement comprising:

a piston reciprocably disposed within a cylinder contained by said brake caliper;

a threaded shaft connected to said piston and movable therewith;

a cylindrical sleeve nut threaded on said shaft;

a one-way clutch including a first part defining a clutch inner surface on at least a portion of the outer cylindrical surface of said sleeve nut, a second part providing selectively actuated clutch locking means received circumferentially about said first part in a normally non-gripping relation therewith so as to permit axial movements of said sleeve nut relative to said second part, and a third part operatively connected with said second part, said third part being movable in one arcuate direction relative to said first part to lock said second part in gripping relation with said first part and being movable in the opposite arcuate direction to unlock said second part from said first part;

said clutch, while said third part is actuated to lock said second part to said first part, defining a torsional force flow path to said sleeve nut from said third part;

and means mounted on said caliper and extending into said cylinder and engaging said third part in arcuate driving relation, said means being actuatable to move said third part in said one arcuate direction to exert torsional force thereon initially to cause said second part to grip said first part and then move said sleeve nut arcuately to cause said sleeve nut to drive said threaded shaft and said piston to apply the brake, and to move said third part in said opposite arcuate direction to release the brake;

said piston being actuatable by pressure in said cylinder to move said piston to apply the brake, and in so moving said piston also moving said threaded shaft and said sleeve nut axially relative to said second part;

and means establishing and retaining said piston and said shaft and said sleeve nut in an adjusted brake position in the cylinder after pressure release.

2. In a vehicle brake assembly of the type including a disc brake caliper positioned in relation to a brake disc whereby friction pads are applied to opposite sides of the brake disc when the brakes are applied, the improvement comprising:

a piston reciprocably disposed within a cylinder contained by said brake caliper;

a threaded shaft connected to said piston and movable therewith;

a cylindrical sleeve nut threaded on said shaft and having an external groove extending in an axial direction;

a clutch member defined by a coil spring received about said cylindrical sleeve nut in a normally nongripping relation therewith;

said coil spring having one end extending into said sleeve nut external groove in slidable relation, and having another end movable arcuately relative to said sleeve nut to cause said coil spring to selectively grip and release said sleeve nut;

and means mounted on said caliper and extending into said cylinder and engaging said coil spring other end, said means being actuatable to move said coil spring other end arcuately in one direction to torsionally stress said coil spring and to cause said coil spring to grip said sleeve nut and move said sleeve nut arcuately to cause said sleeve nut to drive said threaded shaft and said piston to apply the brake, and to move said coil spring other end arcuately in the other direction to release the brake;

said piston being actuatable by pressure in said cylinder to move said piston to apply the brake, and in so moving said piston also moving said threaded shaft and said sleeve nut axially relative to said coil spring and retaining said piston and said shaft and said sleeve nut at an adjusted brake position in the cylinder after pressure release.

3. A disc brake caliper assembly for braking a rotating disc and comprising:

a caliper housing;

first and second brake shoe assemblies located respectively on opposite sides of the disc, the first brake shoe assembly engaging the caliper housing;

a cup shaped piston sealingly and axially slidable in the housing and having its closed end engaging the second brake shoe assembly;

a threaded shaft secured to the piston closed end and extending axially within the piston toward the piston open end;

a sleeve nut threaded on said shaft and relatively movable thereon with concurrent axial and rotational movements;

a coil spring clutch wound about said sleeve nut and having one end slidably but nonrotatably attached thereto, the coils of said spring clutch being immediately adjacent to the outer surface of said sleeve nut and normally in nongripping relation thereto;

shaft means rotatably and sealingly mounted in the housing and having one end extending exteriorly thereof and adapted to be arcuately moved in the housing, said shaft means having another end extending into the open end of said piston and secured to the other end of said spring clutch for moving the spring clutch other end arcuately to selectively tighten said spring clutch into gripping relation with said sleeve nut and to release the gripping action of said spring clutch relative to said sleeve nut;

the coils of said spring clutch gripping said sleeve nut upon slight arcuate movement of said shaft means in the brake applying direction to rotate said sleeve nut upon further arcuate movement of said shaft means and axially drive said threaded shaft and said piston and said second brake shoe assembly toward the disc to engage the second brake shoe assembly in friction braking relation with the disc;

said spring clutch one end, while the coils of said spring clutch are in nongripping relation with said sleeve nut, permitting slidable movement of said sleeve nut relative to said spring clutch upon brake release to permit axial adjustment of said threaded shaft and said piston relative to said sleeve nut and thereby adjust the brake released position of said piston and said brake shoe assemblies for brake lining wear.

4. In a vehicle brake assembly of the type including a disc brake caliper positioned in relation to a brake disc whereby friction pads are applied to opposite sides of the brake disc when the brakes are applied, the improvement comprising:

a piston reciprocably disposed within a cylinder contained by said brake caliper;

a threaded shaft connected to said piston and movable therewith;

a cylindrical sleeve nut threaded on said shaft and having a clutch inner race thereon defining a part of a one-way clutch, said one-way clutch further including a clutch outer race and sprags between said races, at least one of said races being capable of limited axially slidable movement relative to said sprags only while said clutch is released, arcuate movement of said outer race relative to said inner race acting in one arcuate direction to lock said races and said sprags together against relative movement and acting in the other arcuate direction to release said races and said sprags;

and means mounted on said caliper and extending into said cylinder and secured to said outer race, said means being actuatable to move said outer race arcuately in said one arcuate direction to cause said clutch to be locked and then move said sleeve nut arcuately to cause said sleeve nut to drive said threaded shaft and said piston to apply the brake, and to move said outer race arcuately in said other arcuate direction to release said clutch and the brake;

said piston being actuatable by pressure in said cylinder to move said piston to apply the brake, and in so moving said piston also moving said threaded shaft and said sleeve nut axially relative to said outer race and retaining said piston and said threaded shaft and said sleeve nut to an adjusted brake position in the cylinder after pressure release.

5. A disc brake caliper assembly for braking a rotating disc and comprising:

a caliper housing;

first and second brake shoe assemblies located respectively on opposite sides of the disc, the first brake shoe assembly engaging the caliper housing;

a cup shaped piston sealingly and axially slidably in the housing and having its closed end engaging the second brake shoe assembly;

a threaded shaft secured to the piston closed end and extending axially within the piston toward the piston open end;

a sleeve nut threaded on said shaft and relatively movable thereon with concurrent axial and rotational movements;

a one-way clutch positioned about said sleeve nut and having an inner race on said sleeve nut, an outer race, and sprags between said races to selectively lock said races together and release said races;

shaft means rotatably and sealingly mounted in the housing and having one end extending exteriorly thereof and adapted to be arcuately moved in the housing, said shaft means having another end extending into the open end of said piston and operatively secured to said outer race for moving said outer race arcuately to selectively lock said races together and to release said races;

said clutch being locked by arcuate movement of said shaft means in the brake applying direction and adapted to rotate said sleeve nut upon further arcuate movement of said shaft means and axially drive said threaded shaft and said piston and said second brake shoe assembly toward the disc to engage the second brake shoe assembly in friction braking relation with the disc;

said clutch, while released, permitting slidable movement of said sleeve nut relative to said outer race upon brake release to permit axial adjustment of said threaded shaft and said piston relative to said sleeve nut and thereby adjust the brake released position of said piston and said brake shoe assemblies for brake lining wear.

* * * * *